May 16, 1967
W. W. GARSTANG
3,320,557
FEED-THROUGH CAPACITOR
Filed April 2, 1963
2 Sheets-Sheet 1
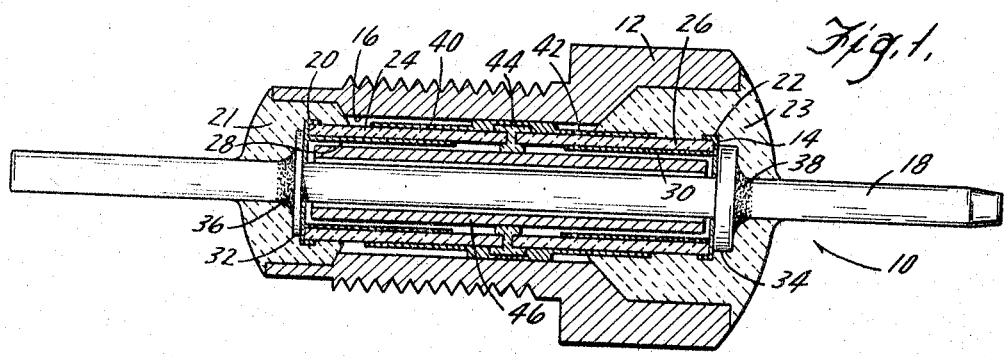
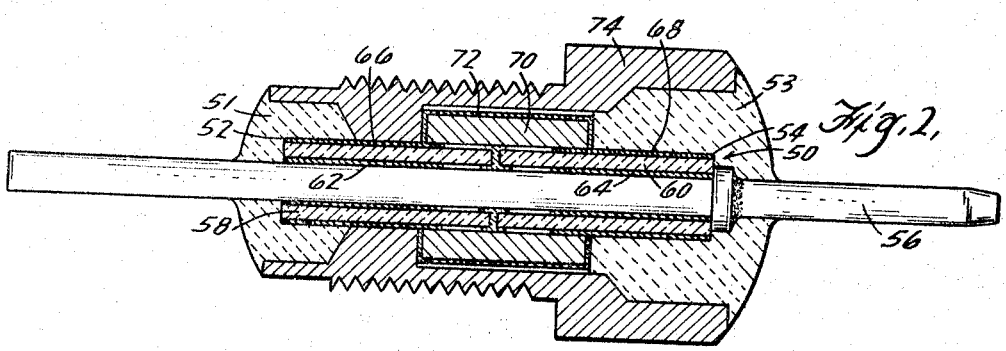
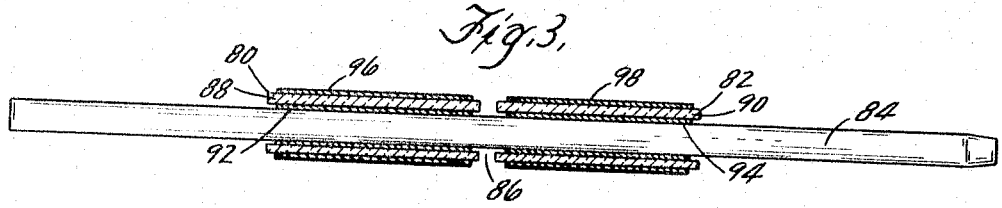
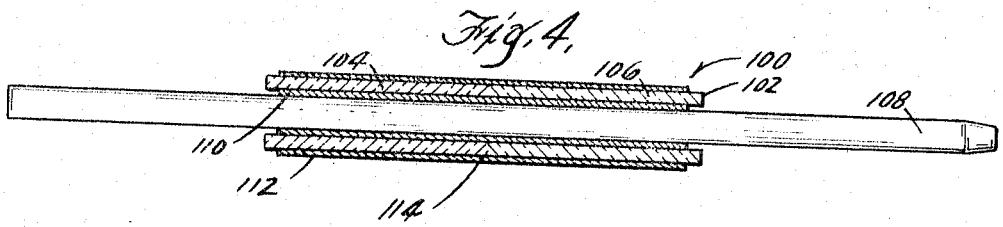
INVENTOR.
WILLIAM W. GARSTANG
BY
*Gerrit D. Yates*
ATTORNEY,

INVENTOR
WILLIAM W. GARSTANG
BY
ATTORNEY

United States Patent Office 3,320,557
Patented May 16, 1967

3,320,557
FEED-THROUGH CAPACITOR
William W. Garstang, Milwaukee, Wis., assignor to Globe-Union Inc., Milwaukee, Wis., a corporation of Delaware
Filed Apr. 2, 1963, Ser. No. 269,915
The portion of the term of the patent subsequent to May 24, 1983, has been disclaimed
3 Claims. (Cl. 333—79)

The invention relates to feed-through capacitors and more particularly, to minimizing cavity resonance phenomena in a feed-through capacitor.

Feed-through capacitors effect attenuation by providing a low transfer impedance path to ground at high frequencies while providing a high transfer impedance path at lower frequencies. Cavity resonance phenomena in feed-through capacitors occurs at particular points (resonant frequencies) within the operating range of the feed-through capacitor creating "suck-out" points or, more particularly, points at which the feed-through capacitor loses its ability to provide attenuation. As an explanation of this phenomena, it has been observed that wave length varies as a function of the dielectric constant of a medium, more particularly, the wave length is reduced as a function of one over the square root of the dielectric constant of the medium. Hence, a relatively long wave length in air will be considerably shortened in the dielectric body of the feed-through capacitor and, at the resonant frequencies, will equal the length of the dielectric body creating a resonant condition. Cavity resonance has the effect of substantially increasing transfer impedance which, at high frequencies, is directly opposed to the intended function of the capacitor of providing a low impedance path.

Various approaches have been proposed in the past with regard to deresonating a feed-through capacitor, however, these approaches have generally fallen short of providing a completely acceptable solution for various reasons, such as increasing costs of or complicating the fabrication of the capacitor. Accordingly, an object of this invention is to provide a simple, economical, readily fabricated and yet highly effective deresonated capacitor.

For the achievement of this and other objects, the preferred embodiment of this invention proposes to provide a feed-through capacitor construction which incorporates dielectric mediums having different dielectric constants to deresonate the feed-through capacitor.

Other objects and advantages will be pointed out in, or be apparent from, the specification and claims, as will obvious modifications of the embodiments shown in the drawings, in which:

FIG. 1 is an axial section through an embodiment of this invention;

FIG. 2 is an axial section through an alternative embodiment;

FIG. 3 illustrates still another alternative embodiment;

FIG. 4 illustrates a further alternative embodiment;

Figure 5:
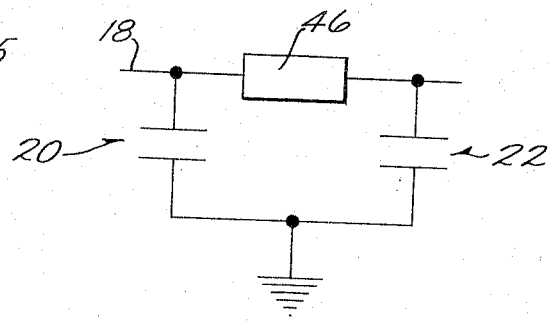
FIG. 5 is a circuit diagram representative of the electrical circuit of the embodiments of FIGS. 1 and 2.

With particular reference to the drawings, a feed-through capacitor 10 includes a suitable mounting bushing 12 for connecting the capacitor to a shielding enclosure or other suitable mounting structure depending on the particular application. The feed-through capacitor 10 surrounds a portion of lead 18 and includes a tubular capacitor assembly 14 positioned in bore 16 of the bushing and surrounding lead 18.

Capacitor assembly 14 comprises first and second capacitors 20 and 22 spaced axially along lead 18 and each including a tubular dielectric body 24 and 26, respectively. Inner capacitor electrodes 28 and 30 are formed on the inner surfaces of the dielectric bodies by a suitable conductive silver paint. The electrodes extend completely around the inner surfaces of the dielectric bodies and over the outer end of each body to engage retaining rings 32 and 34 which are fixed on electrical lead 18 by solder connections 36 and 38. In this manner rings 32 and 34 complete an electrical connection of the inner electrodes 28 and 30 to lead 18 and, also, hold the capacitor assembly 14 against movement relative to the lead. Electrodes 40 and 42 are similarly formed around the outer surfaces of dielectric bodies 24 and 26 and are electrically interconnected by a silver paint portion 44 which also completes electrical connection of the outer electrodes to bushing 12. This completes the circuit of the feed-through capacitor, with the inner electrodes of the capacitor assembly being electrically connected to lead 18 and the outer electrodes adapted to be connected to ground through the bushing.

In accordance with this invention, dielectric bodies 24 and 26 are made of materials having different dielectric constants which, it is believed, attributes different effective lengths to each of the dielectric bodies, i.e. different effective lengths with respect to electrical wave lengths. By attributing relatively different effective lengths to the dielectric bodies, the frequency response (points at which correspondence between body length and wave length occurs) of each body is different to effectively deresonate the feed-through capacitor. With this invention the dielectric bodies can be fabricated having equal lengths and still achieve deresonation by providing different effective lengths thereby facilitating and reducing the cost of manufacture. Furthermore, by achieving deresonation through selection of dielectric materials having different dielectric constants, the available capacitance values and ratios thereof is virtually unlimited and readily obtainable. The particular capacitance value of each capacitor and the ratio between capacitance values can be varied as desired and will be distated primarily by the particular application.

The capacitor assembly as discussed to this point is effective to provide attenuation over a wide range of frequencies and it may be desirable to use, in addition to the capacitor assembly 14, a ferrite bead 46 for improving attenuation characteristics at high frequencies. As can be seen in FIG. 1, the ferrite bead 46 is tubular in shape and coaxially arranged with the capacitor assembly in surrounding relationship with electrode 18. The ferrite bead can be electrically connected to or disconnected from the lead as desired, but is arranged so as to be magnetically coupled with the electrical lead. The ferrite bead provides attenuation at high frequencies and preferably is made of a lossy-type ferrite which displays an extremely high loss factor which is particularly beneficial in providing attenuation.

The inner or adjacent ends of capacitors 20 and 22 can be maintained in spaced relationship by spacing medium 43. The spacing medium 43 can be an insulating coating which, as seen in FIG. 1, is allowed to run through and engage the outside of the ferrite bead to prevent run through of the electrode forming paint during the fabricating process which would short circuit the inner electrodes. More importantly, by separating the inner ends of the capacitors the electrical stress, or electrostatic field, between capacitors is interrupted preventing any cross linking between the inner electrodes which would detrimentally effect attenuation. It may be desirable to utilize a material for spacing medium 43 which has a dielectric constant different from that of both dielectric bodies 24 and 26, e.g. low dielectric constant steatite, so that, in addition to interruping the electrostatic field between capacitors 20 and 22, a third capacitor would, in effect, be provided having a dielectric body with still a different dielectric constant to further enhance deresonation of the feedthrough capacitor.

The ferrite bead can be positioned within the capacitor assembly as illustrated in FIG. 1 or, as illustrated in FIG. 2, it can surround the capacitor assembly. With reference to FIG. 2, a capacitor assembly 50 includes capacitors 52 and 54 spaced axially along lead 56. Capacitors 52 and 54 include tubular dielectric bodies 58 and 60 having inner electrodes 62 and 64 and outer electrodes 66 and 68 formed on the opposed surfaces of each. Ferrite bead 70 surrounds the capacitor assembly and has an electrically conductive coating 72 extending over its outer surface to electrically connect outer electrodes 66 and 68 with each other and to bushing 74. The inner electrodes 62 and 64 directly engage the lead 56 and, it will be noted, that the inner and outer electrodes terminate in spaced relation so that the ferrite bead is not shielded from and can be magnetically coupled with the dielectric bodies and the lead. Similar to the embodiment of FIG. 1 dielectric bodies 58 and 60 are made of materials having different dielectric constants.

Both arrangements, i.e. that of FIG. 1 and FIG. 2, comprise a pi-type filter including an impedance member (the ferrite bead) inductively related with the conductor to provide attenuation at high frequencies and two parallel connected capacitors providing paths to ground to effect attenuation throughout the entire frequency range.

FIGS. 3 and 4 illustrate alternate forms of the capacitor assembly. With reference to FIG. 3, capacitors 80 and 82 are arranged end-to-end on conductor 84 with their adjacent ends separated by an air space 86. Each capacitor portion includes a dielectric body 88 and 90 formed thereon. The inner electrodes directly engage, or are otherwise connected to lead 84, and the outer electrodes can be connected to ground in any suitable manner. Again the dielectric bodies 88 and 90 are made of materials having different dielectric constants and air space 86 will be effective to interrupt the electrostatic field between the separate capacitor units.

In FIG. 4, the feed-through capacitor assembly 100 is shown as constructed with an integral tube 102 which, similar to the heretofore discussed arrangements, includes two capacitor dielectric portions 104 and 106 formed into one tube but utilizing materials having different dielectric constants. These materials are pressed into a single tube so that portions 104 and 106 are positioned in axially-spaced relationship on conductor 108. The portions 104 and 106 are joined at area 114, however, any physical joint is virtually indescernible. Inner and outer electrodes 110 and 112 are formed on the opposed surfaces of the tube 102 and, assuming there is no problem with regard to shielding a ferrite bead (e.g. the bead is eliminated or disposed within the capacitor assembly), the electrodes can run continuously on the inner and outer surfaces. Since two portions having different dielectric constants are provided, the arrangement of FIG. 4 will also provide in effect two capacitor portions having different effective lengths to achieve deresonation of the feed-through capacitor.

Figure 6:
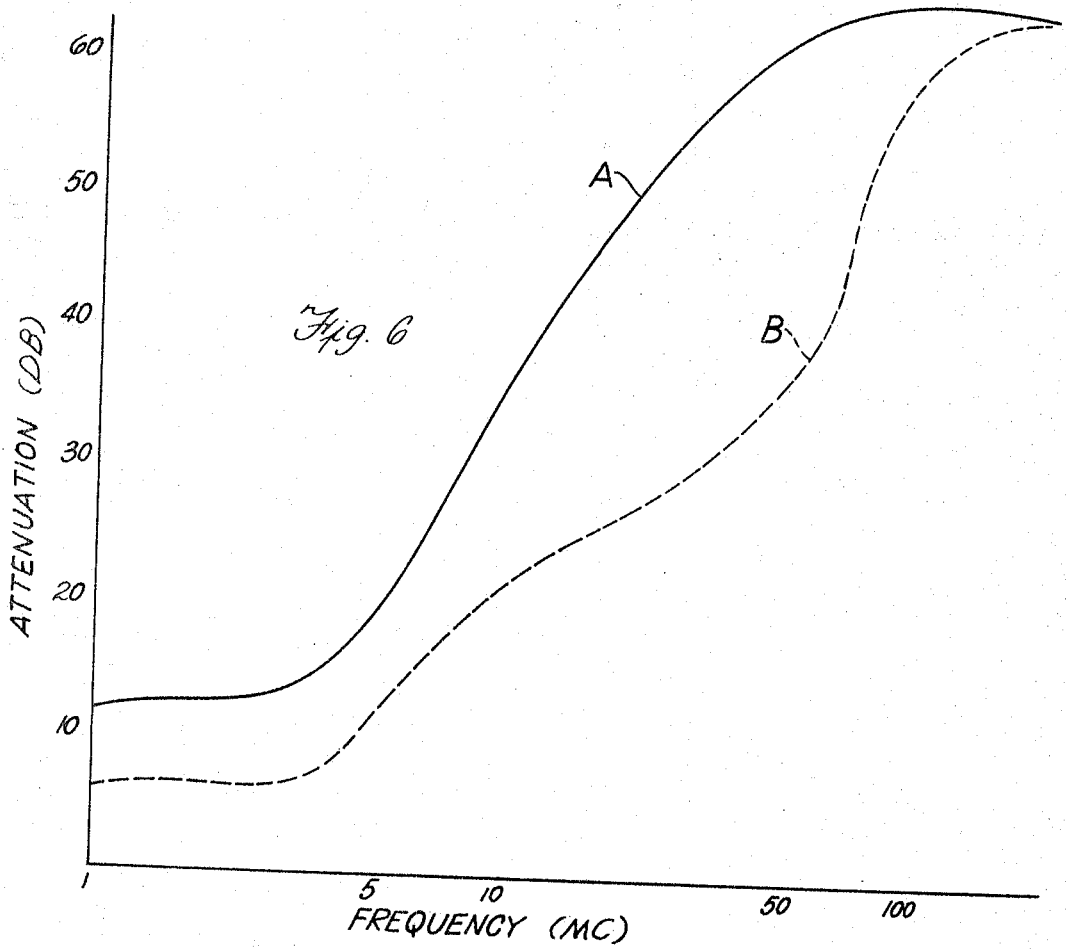
FIG. 6 contains curves illustrating attenuation characteristics achieved at various frequencies with the construction of both FIGS. 1 and 2.

The circuit diagram of FIG. 5 illustrates the equivalent electrical circuit of the embodiments of FIGS. 1 and 2. Correlating the circuit diagram with the structure of FIG. 1, the upper conductor corresponds to lead 18 and has been so designated. The tubular ferrite bead 46 is illustrated as surrounding a portion of lead 18 and capacitors 20 and 22 are illustrated as completing parallel circuits from lead 18 to ground. This circuit representation is also applicable to the embodiment of FIG. 2 wherein ferrite bead 70 would surround lead 56 with capacitors 52 and 54 completing parallel circuits to ground from the lead. The circuit representation without the ferrite bead surrounding the upper conductor would correspond to the electrical circuit of the feed-through capacitors of FIGS. 3 and 4 as incorporated in a conventional bushing. FIG. 6 contains curves A and B which are plottings of typical values of attenuation at various frequencies for the embodiments of FIGS. 1 and 2, respectively.

This invention is not intended to be limited to the various embodiments discussed which are given as illustrations of some of the variations to which this invention lends itself, for example the feed-through capacitor can comprise a plurality of capacitors each separated by air or a suitable spacing medium or formed into an integral tube and are suitable for use with or without a ferrite bead. Accordingly, although this invention has been illustrated and described in connection with particular embodiments thereof, it will be apparent to those skilled in the art that various changes and modifications may be made therein without departing from the spirit of the invention or from the scope of the appended claims.

What I claim is:

1. A deresonated feed-through capacitor comprising a plurality of tubular dielectric portions arranged on a common axis, said tubular dielectric portions characterized by being of substantially equal axial length and having relatively different dielectric constants so as to exhibit different effective lengths with respect to electrical wave lengths, electrodes on the inner and outer surfaces of each of said tubular dielectric portions, said tubular portions being arranged end-to-end, a spacing medium disposed between the adjacent ends of said tubular portions and characterized by having a dielectric constant different from that of said tubular dielectric portions, and a ferrite body coaxially arranged with said tubular portions.

2. A deresonated feed-through capacitor adapted for use in combination with a conductor and comprising, in combination, first and second capacitive portions each including first and second dielectric bodies surrounding a portion of and spaced axially along said conductor, electrodes positioned on the inner and outer surfaces of each of said dielectric bodies in capacitive relationship, said capacitive portions characterized in that the dielectric constants of said dielectric bodies are relatively different so that said first and second capacitive portions exhibit different resonant conditions with respect to electrical wave lengths and each other, and a ferrite body coaxially arranged with said dielectric body relative to said conductor.

3. A tubular feed-through capacitor including at least first and second capacitive portions each including a tubular dielectric portion having electrodes positioned thereon in capacitive relationship, said tubular portions positioned end-to-end and aligned along a common axis with adjacent ends thereof in relative spaced relationship and characterized in that the dielectric constant of said first capacitive portion is different from the dielectric constant of said second capacitive portion, a spacing medium disposed intermediate said adjacent ends of said tubular portions and comprising a material characterized by a dielectric constant different from that of the tubular dielectric portions of said first and second capacitive portions, said first and second capacitive portions being of substantially equal physical length and exhibiting different resonant conditions.

References Cited by the Examiner

UNITED STATES PATENTS

| 2,892,162 | 6/1959 | Bennett | 333—29 |
|---|---|---|---|
| 2,983,855 | 5/1961 | Schlicke | 333—79 |
| 3,002,162 | 9/1961 | Garstang | 333—1 |
| 3,005,168 | 10/1961 | Pye | 333—84 |
| 3,007,121 | 10/1961 | Schlicke | 333—79 |
| 3,035,237 | 5/1962 | Schlicke | 333—79 |
| 3,200,355 | 8/1965 | Dahlen | 333—79 |
| 3,243,738 | 3/1966 | Schlicke et al. | 333—79 |
| 3,253,198 | 5/1966 | Garstang | 317—243 |

HERMAN KARL SAALBACH, *Primary Examiner.*

E. LIEBERMAN, C. BARAFF, *Assistant Examiner.*